United States Patent [19]

Mawhinney

[11] 4,339,753
[45] Jul. 13, 1982

[54] VEHICLE IDENTIFICATION SYSTEM

[75] Inventor: Daniel D. Mawhinney, Livingston, N.J.

[73] Assignee: RCA Corporation, New York, N.Y.

[21] Appl. No.: 105,124

[22] Filed: Dec. 19, 1979

[51] Int. Cl.³ .................... G01S 13/78; G01S 13/58
[52] U.S. Cl. ................................. 343/6.5 SS; 343/8
[58] Field of Search ............... 343/6.5 R, 6.5 SS, 8

[56] References Cited

U.S. PATENT DOCUMENTS

| | | | |
|---|---|---|---|
| 3,918,057 | 11/1975 | Van Tol | 343/6.5 SS X |
| 4,012,736 | 3/1977 | Angwin | 343/8 |
| 4,038,653 | 7/1977 | Brewster | 343/6.5 SS X |
| 4,104,630 | 8/1978 | Chasek | 343/6.5 SS X |
| 4,114,151 | 9/1978 | Denne et al. | 343/6.5 SS X |
| 4,128,835 | 12/1978 | Russell | 343/6.5 R X |
| 4,231,039 | 10/1980 | Fritzlen et al. | 343/8 |

Primary Examiner—T. H. Tubbesing
Attorney, Agent, or Firm—Samuel Cohen; Robert L. Troike; Raymond E. Smiley

[57] ABSTRACT

A vehicle identification system includes apparatus located on the vehicle for transmitting a continuous wave RF probe signal, a remote interrogator unit responsive to the probe signal for transmitting back thereto an interrogation signal. The apparatus on the vehicle transmits in response to the interrogation signal an identifying code. The probe signal may be further utilized in determining the speed of the vehicle.

5 Claims, 3 Drawing Figures

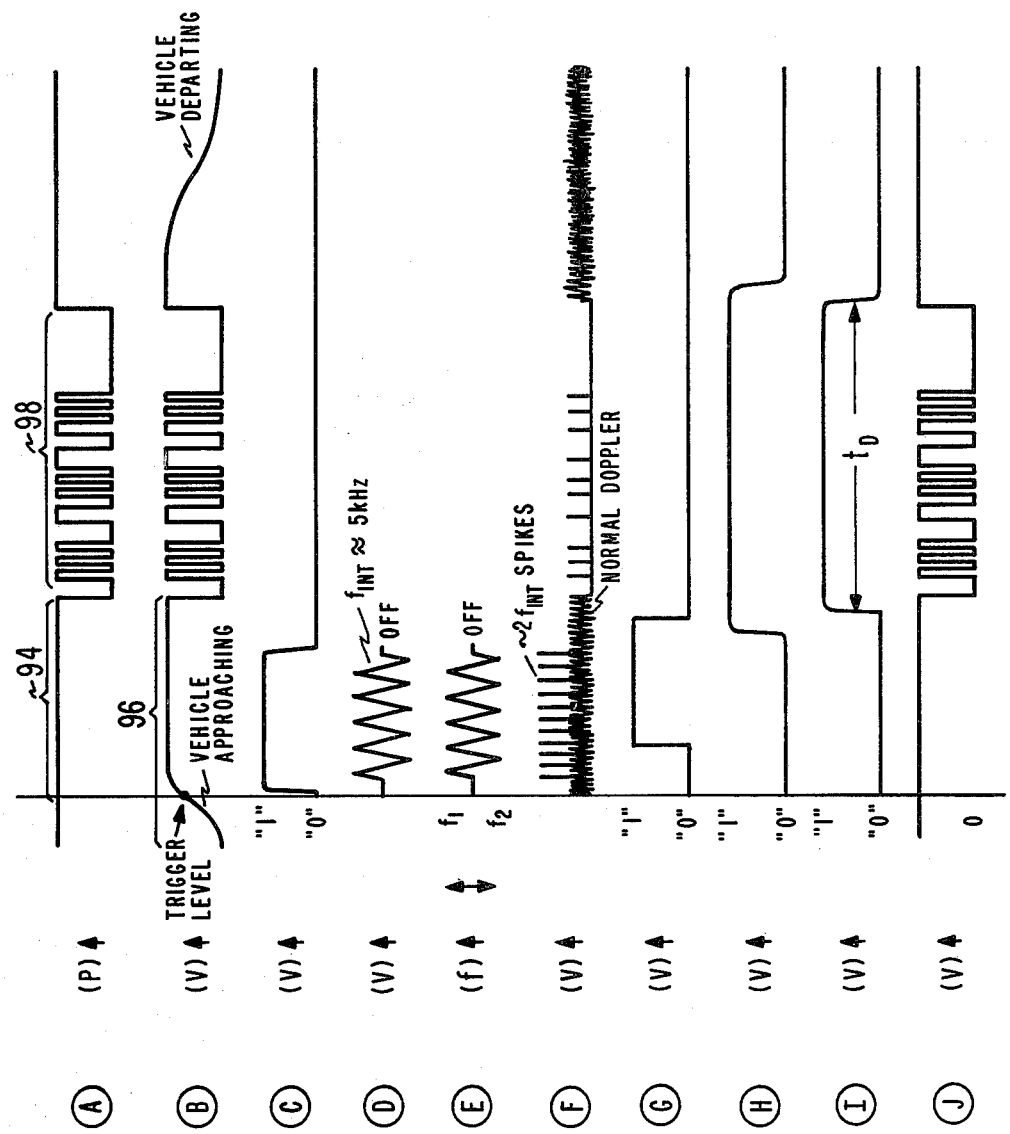

VEHICLE IDENTIFICATION SYSTEM

This invention relates to vehicle identification systems and more particularly to vehicle identification systems involving an interrogating signal.

Railroads, trucking companies, taxicab companies, and bus companies, among others, have a desire to know the whereabouts of their respective vehicle at various times without the aid of operator reporting by means of two-way radios. Experimental systems exist for road-type vehicles (taxis, trucks and buses) which involve, "signposts" placed at strategic points about a city. The signposts continuously transmit interrogation signals to which electronic devices, located in the road vehicles, respond with coded messages, when in the vicinity of signposts. Each signpost requires a relatively large amount of power which renders its use unsuitable for rural locations and is further a source of electromagnetic radiation pollution.

For a number of years, railroads have had a working system for locating all rolling stock, locomotives, as well as freight and passenger cars, at selected points along the railroad right-of-way. The railroad location system involves the use of multicolored coded optically readable tags placed on the side of each car and locomotive to be identified and the use of optical scanning equipment placed beside the track. Unfortunately, dirt, fog, snow, etc., often render the tags unreadable. Further, the tag readers employ a great deal of power and require periodic maintenance of the various mechanical parts employed in the reader. For both reasons, it is not feasible to locate the reader in rural areas where lack of power and access for maintenance are problems.

In accordance with an embodiment of the invention, a vehicle identification system comprises a means on the vehicle for transmitting a probe signal, a means remote from the vehicle for receiving the probe signal and in response thereto, returning an interrogation signal and means on the vehicle responsive to the interrogation signal for transmitting a coded identification signal to identify the vehicle.

In the drawing

FIG. 3 is a set of waveforms useful in understanding the operation of the vehicle identification system of FIGS. 1 and 2.

Figure 1:
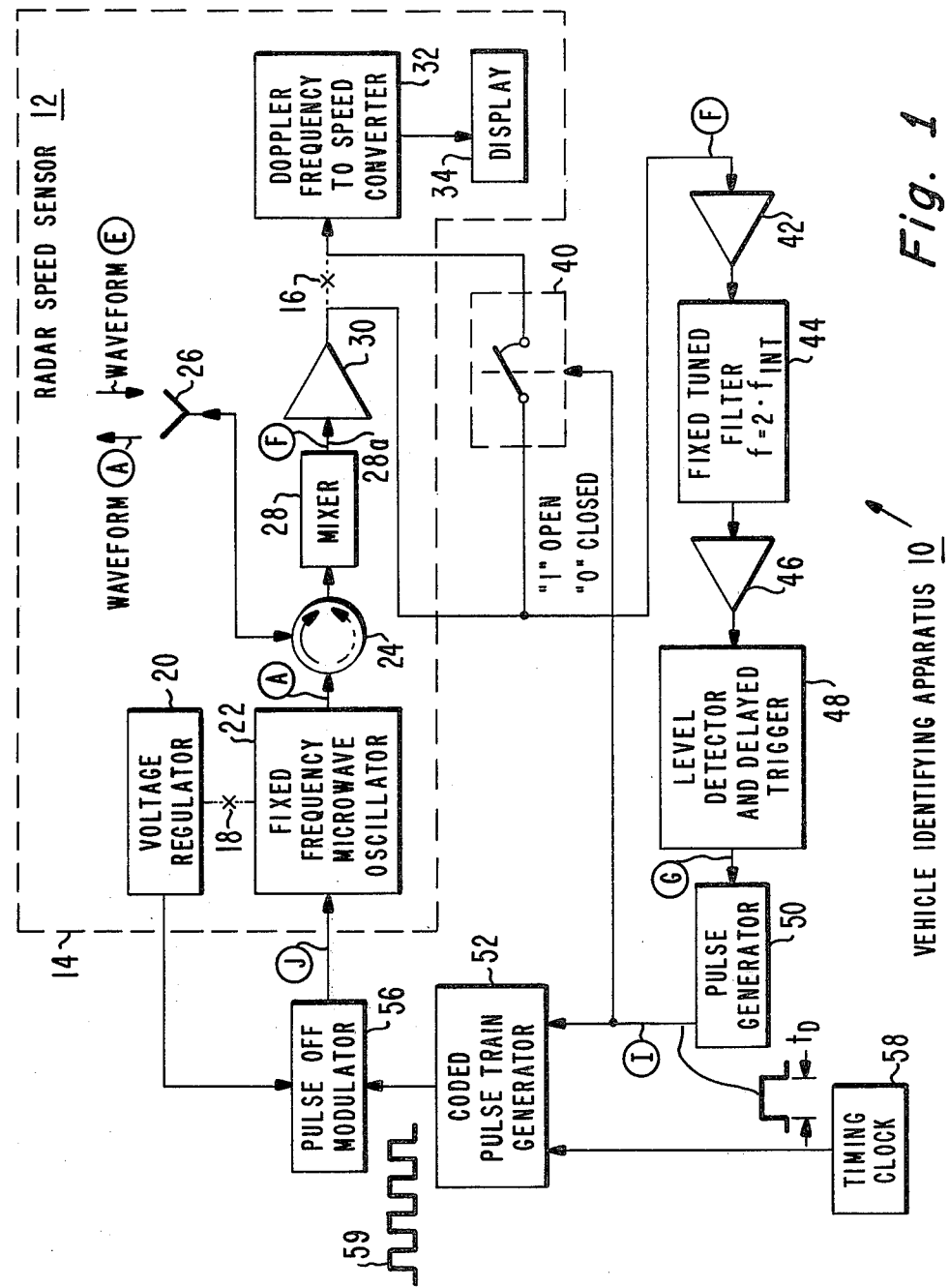
FIG. 1 is a block diagram of a vehicle identifying apparatus including a radar speed sensor in accordance with a preferred embodiment of the present invention.

In FIG. 1 a vehicle mounted portion of a vehicle identifying apparatus 10 includes a radar speed sensor 12 within dashed lines 14 which is of conventional design, as described in detail in an article entitled, "SPEED SENSORS FOR LOCOMOTIVES," by H. C. Johnson, RCA Engineer, August 1976, pp. 34–37, and will therefore be described herein only briefly. Such a radar speed sensor is presently in use in locomotives throughout the country. The X's 16 and 18 at two locations in FIG. 1, indicate breaks in the speed sensor system to enable the remainder of apparatus 10 to be coupled to the speed sensor. The vehicle in which apparatus 10 is mounted is not shown but typically is a motorized vehicle such as a locomotive, truck, bus or auto.

Radar speed sensor 12 comprises a source of regulated voltage 20 conventionally coupled to a fixed frequency oscillator 22 for causing the oscillator to produce an RF continuous wave signal at frequency $f_o$. Oscillator 22 is coupled to a circulator 24 which, in turn, is coupled to a suitable transmitting and receiving antenna 26 such as that described in the aforementioned RCA Engineer article. Antenna 26 directs the RF continuous wave signal toward an RF reflecting surface (not shown) such as the earth or roadway to be thereby reflected back to the antenna. Antenna 26, when attached to a locomotive, is positioned to transmit signals at frequency $f_o$ downward at an angle toward the roadbed between the railroad tracks which acts as an RF reflecting surface. The transmitted waveform is illustrated in FIG. 3, waveform A (hereinafter waveform 3A) portion 94. The encircled letters at various points in FIGS. 1 and 2 relate to the waveforms associated with the equivalent letters in FIG. 3. Frequency $f_o$ lies within a band of frequencies having an upper limit $f_1$, and a lower limit $f_2$ allocated by the governmental frequency regulatory agency for radar speed measuring purposes. In the United States the frequency band is from $f_2 = 10,500$ MHz to $f_1 = 10,550$ MHz.

The signal transmitted by antenna 26 strikes a surface such as a roadbed at an angle, such as 45° and is reflected back to the antenna. Circulator 24 is coupled to mixer 28 for passing signals received at antenna 26 to the mixer which subtractively mixes these signals with a sample of the frequency from oscillator 22 passed by means of leakage through circulator 24 (as indicated by the dashed arrow) to the mixer.

Mixer 28 therefore produces, on line 28a, a doppler frequency signal indicative of the speed of the locomotive or other vehicle (not shown) on which sensor 12 is mounted relative to the ground. The doppler signal passed by mixer 12 is amplified by amplifier 30 and, in the conventional radar speed sensor system, is passed to doppler frequency-to-speed converter 32 which produces a signal of amplitude indicative of speed of the vehicle. The speed indicative signal is passed, in turn, to a display device 34 for display thereon or to be otherwise utilized. Converter 32 is described in detail in the aforementioned RCA Engineer Article and will not be further described here. Display 34 may be simply a voltmeter calibrated in units of speed.

In the vehicle identification system with which this invention is concerned, amplifier 30 is coupled to a normally closed switch 40 and to an amplifier 42 for further amplifying the doppler frequency. Switch 40 is coupled to converter 32 and when closed it acts to pass doppler frequency directly to the converter as previously described. Amplifier 42 is coupled to a narrowband, fixed-tuned filter 44 for passing pulses produced by amplifier 30 for interrogation purposes as will be hereinafter described in more detail.

Filter 44 is coupled to an amplifier 46 which is, in turn, coupled to a level detector 48. Level detector 48 is responsive to a signal passed by filter 44 for producing, after a given time, a logic "1" level pulse of a given duration (waveform 3G).

Level detector 48 is coupled to a pulse generator 50 which is normally at a logic "0" level but is responsive to the trailing edge of the pulse produced by detector 48 for producing a given duration logic "1" level pulse of a duration $t_D$, (waveform 3I).

Pulse generator 50 is coupled to control switch 40 in such a way as to cause switch 40 to open when the pulse from generator 50 is present. Generator 50 is also coupled to the enable terminal of a coded pulse train generator 52. Coded pulse train generator 52, under control of a suitable timing clock 58, produces a preset series of pulses as indicated generally at waveform 59 in FIG. 1. The pulses are unique to each vehicle to be identified. Pulse off modulator 56 which is receptive of pulses from generator 52 is in essence a single-pole, single-throw, normally-closed switch connecting voltage regulator 20 to oscillator 22. Each pulse received from generator 52 momentarily opens the switch to thereby remove voltage from regulator 20 to oscillator 22 and thereby causing the interruption of the frequency signals produced by the oscillator.

Figure 2:
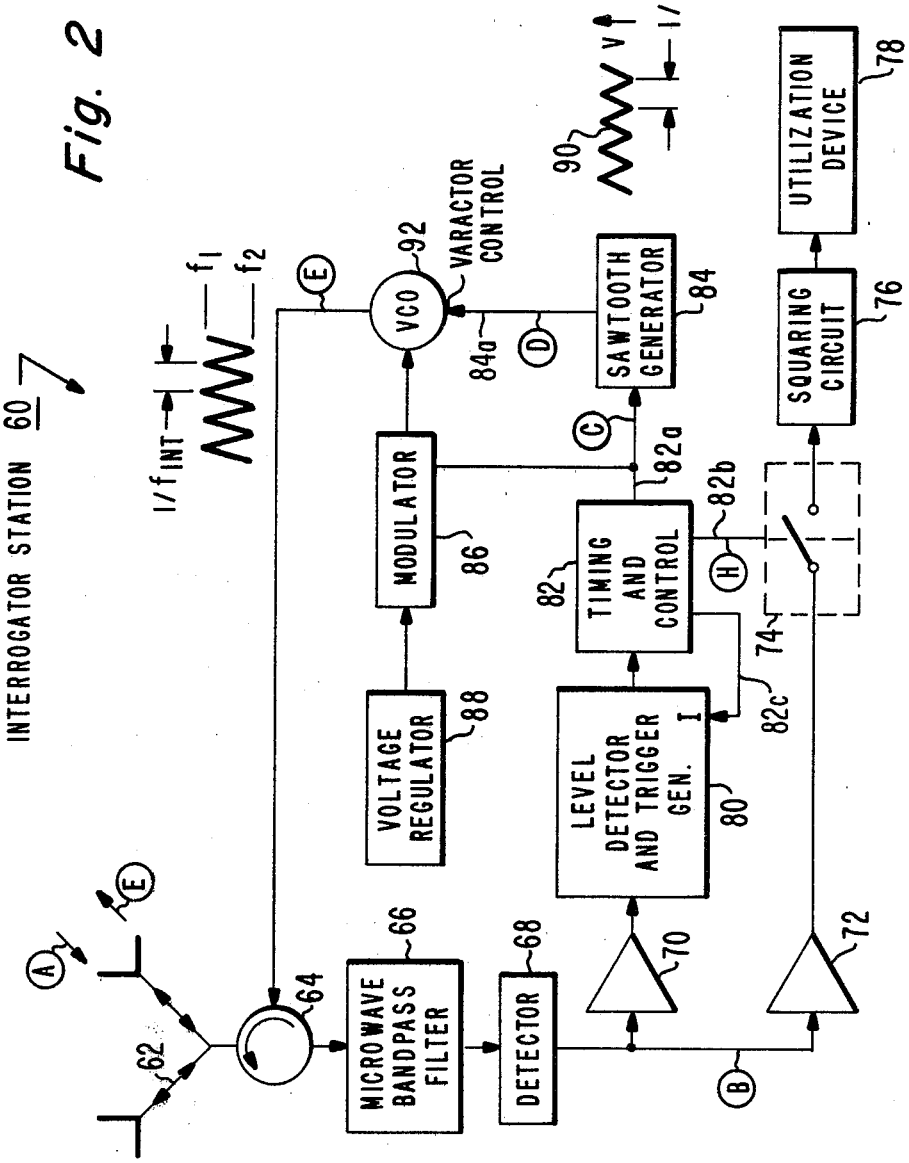
FIG. 2 is a block diagram of the remotely mounted portion of a vehicle identification system also in accordance with a preferred embodiment of the present invention.

FIG. 2 to which attention is now directed, illustrates an interrogator station 60 typically placed between the railroad tracks or on a roadway at a location at which it is desired to interrogate a locomotive or other vehicle (not shown) to determine the identity of the vehicle. Since it is assumed that the vehicle may approach from either direction, a bi-directional antenna means 62 is illustrated. Antenna means 62 is both a transmitting and receiving antenna of suitable design, such as a pair of waveguide horns or a printed circuit dipole array pointing toward the expected location of the antenna 26 on the locomotive or other vehicle. Antenna means 62 is coupled to a circulator 64 for passing signals, received at antenna 62 from antenna 26 (FIG. 1) when the antenna 26 is in proximity to antenna 62, to a microwave bandpass filter 66. Filter 66 is set to pass all frequencies which might be produced by oscillator 22 in radar speed sensor 12. In the locomotive radar speed sensor, as previously mentioned, these frequencies are from 10,500 to 10,550 MHz.

Filter 66 is coupled to a detector 68, which, upon a receipt of a signal of a frequency passed by filter 66, will generate a voltage pulse for the time duration that the frequency is being passed by the filter 66. Detector 68 is coupled to two amplifiers 70 and 72, respectively, which are low level audio frequency amplifiers suitable for increasing the amplitude of the detected signal from radar speed sensor 12 while it is still at some reasonable distance from the interrogation station 60. Amplifier 72 is coupled to a suitable normally open switch 74 which, in turn, is coupled to a suitable squaring amplifier 76 of conventional design. The identifying signal corresponding to the code produced by generator 52 of FIG. 1 ultimately, in a manner to be described, will be passed to amplifier 76 which is, in turn, coupled to any desired utilization device 78. Utilization device 78 may be, for example, a storage means, a display means, a radio transmitter, a computer terminal or teletype means or any combination of these.

Amplifier 70 is coupled to a level detector and trigger pulse generator 80 which produces a pulse when the input signal thereto from amplifier 70 goes above a predetermined amplitude. However, no pulse is produced by generator 80, so long as a pulse is being received at the inhibit (I) terminal thereof. Generator 80 is coupled to a timing and control means (T/C) 82. T/C 82 produces on line 82a, a logic "1" level pulse immediately upon receipt of a pulse from generator 80 and produces on line 82b a logic "1" level pulse after a suitable delay. Line 82b is coupled to control the opening and closing of switch 74. Line 82a from T/C 82 is coupled to sawtooth generator 84 and to a modulator 86. Line 82c of the T/C 82 is coupled to the I terminal of generator 80. Modulator 86 received a regulated dc voltage from voltage regulator 88. Modulator 86 is coupled to a voltage controlled oscillator (VCO) 92 for providing bias voltage thereto for causing the oscillator to oscillate when a logic "1" level pulse is present on line 82a.

Sawtooth generator 84 is responsive to the logic "1" level pulse on line 82a for producing a voltage signal on its output line 84a as illustrated generally at waveform 90, FIG. 2 and in more detail in waveform 3D. That is, it produces an output voltage at a period $1/f_{int}$. The frequency $f_{int}$ is an audio frequency which is equivalent to a doppler frequency produced by mixer 28 (FIG. 1) representing a rate of speed far in excess of any expected to be achieved by a locomotive or other vehicle.

A typical radar speed sensor utilizes a system in which a doppler frequency of 22 hz/mile/hour of speed of the vehicle is generated by mixer 28. For reasons to be discussed, speed sensor 12 is responsive to a signal of frequency $f_{int}$ for producing a signal of frequency $2 \cdot f_{int}$. Therefore, a $f_{int}$ frequency of 5000 hz when doubled is 10,000 hz and is equivalent to well over 400 miles per hour which is, of course, far in excess of any ordinary earthbound vehicle.

Line 84a is coupled to the frequency control terminal of a voltage controlled oscillator (VCO) 92. Modulator 86 is coupled to the voltage terminal of VCO 92. When the voltage from modulator 86 is present at VCO 92, the VCO 92 is caused to produce a frequency which alternates between frequency $f_1$ and frequency $f_2$ at a rate $f_{int}$, where, as previously mentioned, frequencies $f_1$ and $f_2$ are the allowed limits of frequency of oscillator 22 (FIG. 1). VCO 92 is coupled to circulator 64 to pass signals generated by the VCO 92 to and out of antenna means 62, as illustrated by waveform 3E, back to antenna 26 (FIG. 1) when in proximity to antenna 62.

Operation of the vehicle identification system, of FIGS. 1 and 2, will now be described with reference as appropriate to the waveforms of FIG. 3. It will initially be assumed that the vehicle (not shown) carrying apparatus 10 of FIG. 1 is some distance removed from interrogator station 60 of FIG. 2, such that antenna means 62 is not receiving signals produced by antenna 26. Voltage regulator 20 produces a voltage such as to cause oscillator 22 to produce a signal at a given fixed frequency $f_o$ lying somewhere between frequencies $f_1$ and $f_2$. This frequency signal illustrated in terms of power versus time in waveform 3A, portion 94, is transmitted by antenna 26 toward a suitable surface such at the roadbed of railroad tracks.

In the absence of proximity to interrogator station 60, the signal at frequency $f_o$ is reflected from the roadbed or other suitable objects and returned at a slightly different frequency back to antenna 26. The frequency difference as is well known to those skilled in the art is referred to as the doppler frequency and is indicative of the speed of the locomotive or other vehicle.

The returned signal is passed by circulator 24 to mixer 28 as is a sample of the $f_o$ signal from oscillator 22. Mixer 28 subtractively mixes the returned reflected signal and the transmitted signal to produce a doppler frequency signal on line 28a which is amplified by amplifier 30 and passed through switch 40 to converter 32. Converter 32 converts the incoming frequency signal into a signal indicative of the speed of the vehicle and that speed signal is passed to a display 34 for display or other utilization purposes. All the operation to this point is that of a conventional radar speed sensor.

During this time station 60 (FIG. 2) is in a standby condition with the various elements therein only consuming sufficient power to recognize incoming signals to antenna 62. With small signal solid state type components, sufficiently small power is consumed in standby condition such that battery power of station 60 is possible enabling it to be placed in locations where line power is not present.

When the identifying apparatus 10 comes into proximity with interrogator 60, and thus antenna 26 is in proximity to antenna means 62, the signal, waveform 3A, will be received by antenna means 62 and by means of circulator 64 passed to microwave bandpass filter 66. Since the frequency of the signal produced by oscillator 22, $f_o$, lies between $f_1$ and $f_2$, the signal will be passed by filter 66 and detected by detector 68. Detector 68, upon receipt of the signal from filter 66, produces a voltage signal, waveform 3B portion 96.

At time t=0 in FIG. 3, detector 68 produces a voltage of sufficient amplitude to, via amplifier 70, trigger generator 80 to send a pulse to T/C 82. T/C 82 upon receipt of a pulse from generator 80 produces on line 82c a pulse to inhibit further pulses being produced by generator 80 until all actions to be described are complete. At the same time, T/C 80 produces on line 82a, a logic "1" level, waveform 3C for a given fixed period of time which is a fraction of the time that antenna 26 and antenna means 62 are in proximity, such as for example, one-fourth of the time at some known maximum speed of the vehicle.

During the time that the pulse is produced on line 82a, sawtooth generator 84, is caused to produce the voltage waveform 90, FIG. 2 while modulator 86 is turned on to cause VCO 92 to produce a frequency spectrum between $f_1$ and $f_2$ passing between those two extremes at the rate of $f_{int}$ determined by the frequency of signal produced by generator 84.

The signal thus produced by VCO 92, waveform 3E, is passed by circulator 64 to antenna means 62 and then into antenna 26 to be received by mixer 28. Mixer 28 is capable of mixing signals only at a frequency at or near $f_o$ produced by oscillator 22. Therefore, when it is receiving the signal produced by VCO 92 that is the signal passing between $f_1$ above $f_o$ and $f_2$ below $f_o$ it will produce a signal of amplitude greater than that associated with the normal doppler frequency twice during each cycle of the signal from VCO 92 waveform 3E. That is when VCO 92 passes from frequency $f_2$ to frequency $f_1$ a spike will be produced by mixer 28 when the signal passes through $f_o$ and a second spike will be generated by mixer 28 upon the downward swing of signal from VCO 92 as it passes through $f_o$ from frequency $f_1$ to $f_2$.

These spikes will be generated at the rate of 10,000 hz assuming a $f_{int}$ frequency of 5000 hz. These spikes which are generated on top of or in addition to a normal doppler frequency produced by mixer 28 are passed to filter 44. Filter 44 is tuned to a frequency which is two times $f_{int}$ and therefore passes the spikes to amplifier 46 and thence to level detector 48. Thus, during the time that VCO 92 is producing the waveform 3E, which is during the time that a pulse is present on line 82a, level detector 48 is producing a pulse illustrated on waveform 3G. It will be noted from FIG. 3 that waveform G is delayed slightly in time from waveform C because of the time delay associated with the relatively narrow frequency band response of filter 44 and amplifier 46.

Level detector and trigger 48 is set to produce a pulse which terminates just slightly after the termination of the pulse on line 82a, that is, just slightly after the generation of the logic "1" pulse, waveform 3C. Thus, shortly following the time at which VCO 92 should cease to be generating waveform 3E, the pulse from trigger 48 ceases triggering pulse generator 50 to produce the logic "1" level pulse illustrated in waveform 3I, that is, a pulse of time duration the waveform 3I logic "1" pulse. When $t_D$ is present, two events occur concurrently. First, switch 40 is opened so that the converter 32 is not responsive to anything received from mixer 28 and, second, generator 52 produces a coded pulse train uniquely identifying the vehicle in which apparatus 10 is placed. With switch 40 open no erroneous speed will be displayed on display 34.

Generator 52 connects and disconnects voltage regulator 20 from oscillator 22 by means of circuitry in modulator 56. The net effect is that oscillator 22 produces a coded signal as illustrated in portion 98 of waveform 3A. The signal of waveform 3A, portion 98, is transmitted to antenna 62 which is still in proximity with antenna 26. The coded signal alternates between signals at frequency $f_o$ lying between $f_1$ and $f_2$ or, during those portions at which the voltage regulator is disconnected from oscillator 12, no signal. The coded signal is detected by detector 68 and passed to switch 74.

At that time, the coded signal is received at switch 74, T/C 82 is producing a pulse of duration $t_D$ on line 82b which causes switch 74 to close. The signal passed through switch 74 to amplifiers 76 is an amplitude binary coded signal which uniquely identifies the apparatus carrying speed sensor 12. The signal is utilized internally in interrogator station 60 by utilization device 78 or passed on by some means such as further radio transmission or by landlines to some other suitable utilization device (not shown) remote from interrogator station 60. At the termination of the logic "1" level pulse from generator 50, modulator 56 is turned on to pass the voltage from regulator 20 to oscillator 22 to cause the oscillator to again produce a constant frequency $f_o$. Further, switch 40 is closed and the inhibit pulse on line 82c is removed from terminal I of generator 80 so radar speed sensor 12 resumes its normal operation.

In summary then, radar speed sensor 12 in accordance with its normal operation, continuously produces and transmits by means of antenna 26 a radio frequency signal. Return reflected signals back to antenna 26 are utilized in a well known manner to generate a doppler frequency for determining the speed of the vehicle carrying apparatus 10. When antenna 26 is in proximity to antenna means 62, the continuous wave RF signal produced by oscillator 22 acts as a probe signal to activate interrogator station 60 which otherwise remains in an idle condition consuming little power. The probe signal passed by filter 66 and detected by detector 68 triggers T/C 82 to produce an interrogation pulse on line 82a, causing VCO 92 to be activated to produce an interrogation signal illustrated as waveform 3E. The interrogation signal is passed by antenna means 62 to antenna 26 and detected as a series of spikes at frequency $2 \times f_{int}$ by filter 44 which, after a suitable delay, causes generator 52, to be enabled and to produce a coded pulse uniquely identifying the vehicle on which it is mounted. The coded pulses are passed back to interrogation station 60 and therein to a suitable utilization device 78.

It will of course, be understood that the various frequencies and times are by way of example only and will be suitably adjusted to the particular application.

What is claimed is:

1. A combination vehicle speed sensor, mounted on a moving vehicle, and identification system, comprising in combination:
   said speed sensor including means for transmitting a continuous wave RF signal toward an RF reflecting surface to be thereby reflected back to said vehicle;
   said sensor including means responsive to said reflected signal and to said transmitted signal for producing a signal indicative of speed of said vehicle;
   means in spaced relationship with said vehicle and responsive to said continuous wave RF signal for transmitting an interrogating signal to said vehicle;
   said speed sensor including means responsive to said interrogating signal for temporarily interrupting the transmission of said continuous wave signal and for transmitting a coded signal uniquely identifying said vehicle.

2. The combination as set forth in claim 1, wherein said interrogating signal has a specific given frequency component and wherein said means responsive to said interrogating signal includes filter means responsive to said given frequency component for passing said interrogating signal therethrough and further includes means responsive to the passed signal for temporarily interrupting the transmission of said continuous wave signal and for transmitting a coded signal uniquely identifying said vehicle.

3. The combination as set forth in claim 2, wherein said means in spaced relationship with said vehicle includes means responsive to said RF continuous wave signal transmitted by said speed sensor, which is at frequency $f_o$, for producing an interrogating signal of frequency which alternately extends above and below said frequency $f_o$ at said given frequency component rate.

4. A vehicle identification system comprising in combination:
   means on said vehicle for transmitting a continuously wave radio frequency (RF) signal toward a substantially continuously present surface;
   means in spaced relation from said vehicle for receiving said RF signal and in response thereto returning an interrogation signal to said vehicle;
   means on said vehicle responsive to said interrogation signal for transmitting a coded signal for identifying said vehicle;
   means on said vehicle for receiving said RF signal reflected back to said vehicle from said surface; and
   means on said vehicle responsive to said transmitted RF signal and reflected RF signal for producing an indication of the speed of said vehicle.

5. The combination as set forth in claim 1 or claim 4 wherein said means in spaced relation from said vehicle includes means for receiving said coded signal transmitted by said means on said vehicle.

* * * * *